(12) United States Patent
Huang

(10) Patent No.: US 10,698,205 B2
(45) Date of Patent: Jun. 30, 2020

(54) DEVICE ADAPTED TO EYEGLASSES

(71) Applicant: BEIJING 7INVENSUN TECHNOLOGY CO., LTD., Beijing (CN)

(72) Inventor: Tongbing Huang, Beijing (CN)

(73) Assignee: BEIJING FOREVER TECHNOLOGY CO., LTD., Beijing (CN)

( * ) Notice: Subject to any disclaimer, the term of this patent is extended or adjusted under 35 U.S.C. 154(b) by 189 days.

(21) Appl. No.: 15/991,185

(22) Filed: May 29, 2018

(65) Prior Publication Data

US 2019/0235237 A1 Aug. 1, 2019

(30) Foreign Application Priority Data

Feb. 1, 2018 (CN) .......................... 2018 1 0095919

(51) Int. Cl.
*G02C 1/00* (2006.01)
*G02B 27/00* (2006.01)
(Continued)

(52) U.S. Cl.
CPC ..... *G02B 27/0093* (2013.01); *G02B 27/0176* (2013.01); *G02C 11/04* (2013.01);
(Continued)

(58) Field of Classification Search
CPC .... G02B 2027/0178; G02B 2027/0138; G02B 27/0093; G02B 27/0176; G02C 11/10; G02C 7/00
(Continued)

(56) References Cited

U.S. PATENT DOCUMENTS

| 3,876,295 A | 4/1975 | Loughner |
| 4,456,347 A | 6/1984 | Stahly |

(Continued)

FOREIGN PATENT DOCUMENTS

| CN | 205594245 U | 9/2016 |
| CN | 106874895 A | 6/2017 |

(Continued)

OTHER PUBLICATIONS

First Japanese Office Action regarding Application No. 2018-109964 dated Aug. 7, 2019. English translation provided by Unitalen Attorneys at Law.

(Continued)

*Primary Examiner* — Hung X Dang
(74) *Attorney, Agent, or Firm* — Harness, Dickey & Pierce, P.L.C.

(57) ABSTRACT

A device adapted to a pair of eyeglasses is provided according to the present application, which includes a means for collecting eye data; and an adaption frame configured to retain the means for collecting eye data. The adaption frame includes an adapter unit configured to secure the adaption frame onto the eyeglasses and/or remove the adaption frame from the eyeglasses. The device according to the present application frees the subject from wearing an apparatus having a complicated structure, which greatly reduces the difficulty and inconvenience in wearing of the subject. Moreover, the device according to the present application has a simple structural design, can be adapted to the pair of eyeglasses in a removable manner, can improve the portability in use, and also facilitates storage.

14 Claims, 3 Drawing Sheets

(51) Int. Cl.
*G02C 11/04* (2006.01)
*G02C 11/00* (2006.01)
*G02B 27/01* (2006.01)
*G06F 3/01* (2006.01)
*G02C 9/04* (2006.01)

(52) U.S. Cl.
CPC .............. *G02C 11/10* (2013.01); *G06F 3/013* (2013.01); *G02B 2027/0138* (2013.01); *G02B 2027/0178* (2013.01); *G02C 9/04* (2013.01); *G02C 2200/06* (2013.01)

(58) Field of Classification Search
USPC .................................................. 351/158, 41
See application file for complete search history.

(56) References Cited

U.S. PATENT DOCUMENTS

| | | | |
|---|---|---|---|
| 6,051,720 A | 4/2000 | Geibel et al. | |
| 6,491,391 B1 | 12/2002 | Blum et al. | |
| 6,491,394 B1 | 12/2002 | Blum et al. | |
| 6,517,203 B1 | 2/2003 | Blum et al. | |
| 6,619,799 B1 | 9/2003 | Blum et al. | |
| 6,733,130 B2 | 5/2004 | Blum et al. | |
| 6,851,805 B2 | 2/2005 | Blum et al. | |
| 6,857,741 B2 | 2/2005 | Blum et al. | |
| 6,871,951 B2 | 3/2005 | Blum et al. | |
| 6,892,846 B2 | 5/2005 | Mellot et al. | |
| 6,918,670 B2 | 7/2005 | Blum et al. | |
| 6,927,894 B2 | 8/2005 | Blum et al. | |
| 6,986,579 B2 | 1/2006 | Blum et al. | |
| 7,018,040 B2 | 3/2006 | Blum et al. | |
| 7,019,890 B2 | 3/2006 | Meredith et al. | |
| 7,023,594 B2 | 4/2006 | Blum et al. | |
| 7,077,519 B2 | 7/2006 | Blum et al. | |
| 7,092,144 B2 | 8/2006 | Blum et al. | |
| 7,188,948 B2 | 3/2007 | Blum et al. | |
| 7,234,809 B2 | 6/2007 | Blum et al. | |
| 7,264,354 B2 | 9/2007 | Blum et al. | |
| 7,290,875 B2 | 11/2007 | Blum et al. | |
| 7,290,876 B2 | 11/2007 | Duston et al. | |
| 7,393,101 B2 | 7/2008 | Blum et al. | |
| 7,396,126 B2 | 7/2008 | Blum et al. | |
| 7,404,636 B2 | 7/2008 | Blum et al. | |
| 7,425,066 B2 | 9/2008 | Blum et al. | |
| 7,475,984 B2 | 1/2009 | Blum et al. | |
| 7,475,985 B2 | 1/2009 | Blum et al. | |
| 7,517,083 B2 | 4/2009 | Blum et al. | |
| 7,524,059 B2 | 4/2009 | Blum et al. | |
| 7,533,993 B2 | 5/2009 | Blum et al. | |
| 7,604,349 B2 | 10/2009 | Blum et al. | |
| 7,619,809 B2 | 11/2009 | Blum et al. | |
| 7,731,358 B2 | 6/2010 | Blum et al. | |
| 7,744,214 B2 | 6/2010 | Blum et al. | |
| 7,744,215 B2 | 6/2010 | Blum et al. | |
| 7,775,660 B2 | 8/2010 | Stewart et al. | |
| 7,883,206 B2 | 2/2011 | Blum et al. | |
| 7,883,207 B2 | 2/2011 | Iyer et al. | |
| 7,926,941 B2 | 4/2011 | Blum et al. | |
| 7,988,286 B2 | 8/2011 | Blum et al. | |
| 7,997,733 B2 | 8/2011 | Blum et al. | |
| 8,029,134 B2 | 10/2011 | Blum et al. | |
| 8,047,651 B2 | 11/2011 | Blum et al. | |
| 8,075,132 B2 | 12/2011 | Blum et al. | |
| 8,092,016 B2 | 1/2012 | Blum et al. | |
| 8,112,646 B2 | 2/2012 | Tsai | |
| 8,145,920 B2 | 3/2012 | Tsai et al. | |
| 8,156,353 B2 | 4/2012 | Tsai | |
| 8,197,063 B2 | 6/2012 | Iyer et al. | |
| 8,308,295 B2 | 11/2012 | Blum et al. | |
| 8,333,470 B2 | 12/2012 | Blum et al. | |
| 8,337,014 B2 | 12/2012 | Kokonaski et al. | |
| 8,434,865 B2 | 5/2013 | Blum et al. | |
| 8,479,028 B2 | 7/2013 | Tsai et al. | |
| 8,579,435 B2 | 11/2013 | Blum et al. | |
| 8,641,191 B2 | 2/2014 | Blum et al. | |
| 8,661,167 B2 | 2/2014 | Hsin et al. | |
| 8,662,665 B2 | 3/2014 | Iyer et al. | |
| 8,708,483 B2 | 4/2014 | Kokonaski et al. | |
| 8,727,531 B2 | 5/2014 | Blum et al. | |
| 8,778,022 B2 | 7/2014 | Blum et al. | |
| 8,783,861 B2 | 7/2014 | Blum et al. | |
| 8,801,174 B2 | 8/2014 | Willey | |
| 8,905,541 B2 | 12/2014 | Blum et al. | |
| 8,915,588 B2 | 12/2014 | Blum et al. | |
| 8,922,902 B2 | 12/2014 | Blum et al. | |
| 8,931,896 B2 | 1/2015 | Blum et al. | |
| 8,944,590 B2 | 2/2015 | Blum et al. | |
| 8,979,259 B2 | 3/2015 | Haddock et al. | |
| 9,028,062 B2 | 5/2015 | Kokonaski et al. | |
| 9,033,494 B2 | 5/2015 | Blum et al. | |
| 9,033,502 B2 | 5/2015 | Nistico et al. | |
| RE45,600 E | 7/2015 | Tsai, Jr. et al. | |
| 9,107,622 B2 | 8/2015 | Nistico et al. | |
| 9,122,083 B2 | 9/2015 | Blum et al. | |
| 9,124,796 B2 | 9/2015 | Blum et al. | |
| 9,155,614 B2 | 10/2015 | Blum et al. | |
| 9,170,452 B2 | 10/2015 | Blum et al. | |
| 9,323,074 B1 | 4/2016 | Blum et al. | |
| 9,323,101 B2 | 4/2016 | Blum et al. | |
| 9,411,173 B1 | 8/2016 | Blum et al. | |
| 9,470,908 B1 | 10/2016 | Frankel et al. | |
| 9,470,909 B2 | 10/2016 | Willey et al. | |
| 9,500,883 B2 | 11/2016 | Blum et al. | |
| 9,568,603 B2 | 2/2017 | Yahav et al. | |
| 9,671,623 B2 | 6/2017 | Chute et al. | |
| 9,690,117 B2 | 6/2017 | Blum et al. | |
| 9,710,058 B2 | 7/2017 | Gustafsson et al. | |
| 9,778,489 B2 | 10/2017 | Blum et al. | |
| 9,801,709 B2 | 10/2017 | Blum et al. | |
| 9,804,420 B2 | 10/2017 | Chute et al. | |
| 9,823,494 B2 | 11/2017 | Blum et al. | |
| 9,876,966 B2 | 1/2018 | Wang et al. | |
| 9,946,097 B2 | 4/2018 | Willey | |
| 9,958,705 B2 | 5/2018 | Blum et al. | |
| 10,092,395 B2 | 10/2018 | Blum et al. | |
| 10,114,235 B2 | 10/2018 | Blum et al. | |
| 10,126,569 B2 | 11/2018 | Blum et al. | |
| 10,159,563 B2 | 12/2018 | Blum et al. | |
| 10,172,704 B2 | 1/2019 | Blum et al. | |
| 10,353,429 B2 | 7/2019 | Blum et al. | |
| 10,359,649 B2 | 7/2019 | Willey | |
| 10,379,575 B2 | 8/2019 | Blum et al. | |
| 2002/0140899 A1 | 10/2002 | Blum et al. | |
| 2003/0007240 A1 | 1/2003 | Blum et al. | |
| 2003/0058406 A1 | 3/2003 | Blum et al. | |
| 2003/0210377 A1 | 11/2003 | Blum et al. | |
| 2003/0231293 A1 | 12/2003 | Blum et al. | |
| 2004/0027501 A1 | 2/2004 | Blum et al. | |
| 2004/0027536 A1 | 2/2004 | Blum et al. | |
| 2004/0051846 A1 | 3/2004 | Blum et al. | |
| 2004/0056986 A1 | 3/2004 | Blum et al. | |
| 2004/0074687 A1 | 4/2004 | Mellot et al. | |
| 2004/0084790 A1 | 5/2004 | Blum et al. | |
| 2004/0156021 A1 | 8/2004 | Blum et al. | |
| 2004/0223113 A1 | 11/2004 | Blum et al. | |
| 2005/0073739 A1 | 4/2005 | Meredith et al. | |
| 2005/0099594 A1 | 5/2005 | Blum et al. | |
| 2005/0140924 A1 | 6/2005 | Blum et al. | |
| 2005/0168687 A1 | 8/2005 | Blum et al. | |
| 2005/0185135 A1 | 8/2005 | Blum et al. | |
| 2005/0200983 A1 | 9/2005 | Blum et al. | |
| 2005/0206844 A1 | 9/2005 | Blum et al. | |
| 2005/0213027 A1 | 9/2005 | Blum et al. | |
| 2005/0219460 A1 | 10/2005 | Blum et al. | |
| 2005/0270481 A1 | 12/2005 | Blum et al. | |
| 2006/0023004 A1 | 2/2006 | Duston et al. | |
| 2006/0092340 A1 | 5/2006 | Blum et al. | |
| 2006/0095128 A1 | 5/2006 | Blum et al. | |
| 2006/0098164 A1 | 5/2006 | Blum et al. | |
| 2006/0126698 A1 | 6/2006 | Blum et al. | |
| 2006/0139570 A1 | 6/2006 | Blum et al. | |
| 2006/0192918 A1 | 8/2006 | Blum | |
| 2006/0238701 A1 | 10/2006 | Blum | |

(56) References Cited

U.S. PATENT DOCUMENTS

| | | |
|---|---|---|
| 2006/0262383 A1 | 11/2006 | Blum et al. |
| 2007/0052920 A1 | 3/2007 | Stewart et al. |
| 2007/0081126 A1 | 4/2007 | Blum et al. |
| 2007/0091258 A1 | 4/2007 | Blum et al. |
| 2007/0146627 A1 | 6/2007 | Blum et al. |
| 2007/0216862 A1 | 9/2007 | Blum et al. |
| 2007/0242173 A1 | 10/2007 | Blum et al. |
| 2007/0242224 A1 | 10/2007 | Blum et al. |
| 2007/0258039 A1 | 11/2007 | Duston et al. |
| 2008/0002150 A1 | 1/2008 | Blum et al. |
| 2008/0100792 A1 | 5/2008 | Blum et al. |
| 2008/0106633 A1 | 5/2008 | Blum et al. |
| 2008/0106694 A1 | 5/2008 | Blum et al. |
| 2008/0129953 A1 | 6/2008 | Blum et al. |
| 2008/0208335 A1 | 8/2008 | Blum et al. |
| 2008/0218689 A1 | 9/2008 | Blum et al. |
| 2008/0246922 A1 | 10/2008 | Blum et al. |
| 2008/0273166 A1 | 11/2008 | Kokonaski et al. |
| 2008/0273169 A1 | 11/2008 | Blum et al. |
| 2008/0316425 A1 | 12/2008 | Blum et al. |
| 2009/0033866 A1 | 2/2009 | Blum et al. |
| 2009/0077394 A1 | 3/2009 | Tsai et al. |
| 2009/0077395 A1 | 3/2009 | Tsai |
| 2009/0077396 A1 | 3/2009 | Tsai et al. |
| 2009/0077401 A1 | 3/2009 | Tsai |
| 2009/0079938 A1 | 3/2009 | Blum et al. |
| 2009/0091818 A1 | 4/2009 | Haddock et al. |
| 2009/0103044 A1 | 4/2009 | Duston et al. |
| 2009/0153794 A1 | 6/2009 | Iyer et al. |
| 2009/0153795 A1 | 6/2009 | Blum et al. |
| 2009/0161066 A1 | 6/2009 | Blum et al. |
| 2009/0195749 A1 | 8/2009 | Blum et al. |
| 2009/0201460 A1 | 8/2009 | Blum et al. |
| 2009/0264966 A1 | 10/2009 | Blum et al. |
| 2010/0073632 A1 | 3/2010 | Blum et al. |
| 2010/0110368 A1 | 5/2010 | Chaum |
| 2010/0153590 A1 | 6/2010 | Hsin et al. |
| 2010/0271588 A1 | 10/2010 | Kokonaski et al. |
| 2011/0007266 A1 | 1/2011 | Blum et al. |
| 2011/0037946 A1 | 2/2011 | Blum et al. |
| 2011/0043751 A1 | 2/2011 | Blum et al. |
| 2011/0043752 A1 | 2/2011 | Blum et al. |
| 2011/0176103 A1 | 7/2011 | Iyer et al. |
| 2011/0194069 A1 | 8/2011 | Blum et al. |
| 2011/0221656 A1* | 9/2011 | Haddick ............ G02B 27/0172 345/8 |
| 2011/0235186 A1 | 9/2011 | Blum et al. |
| 2011/0279772 A1 | 11/2011 | Blum et al. |
| 2012/0002159 A1 | 1/2012 | Blum et al. |
| 2012/0002160 A1 | 1/2012 | Blum et al. |
| 2012/0008094 A1 | 1/2012 | Blum et al. |
| 2012/0019773 A1 | 1/2012 | Blum et al. |
| 2012/0038882 A1 | 2/2012 | Blum et al. |
| 2012/0127420 A1 | 5/2012 | Blum et al. |
| 2012/0127423 A1 | 5/2012 | Blum et al. |
| 2012/0137029 A9 | 5/2012 | Hsin et al. |
| 2012/0178491 A1 | 7/2012 | Tsai |
| 2012/0262667 A1 | 10/2012 | Willey |
| 2013/0003014 A1 | 1/2013 | Iyer et al. |
| 2013/0010256 A1 | 1/2013 | Haddock et al. |
| 2013/0050639 A1 | 2/2013 | Trajkovska et al. |
| 2013/0070198 A1 | 3/2013 | Willey et al. |
| 2013/0070199 A1 | 3/2013 | Blum et al. |
| 2013/0135181 A1 | 5/2013 | Eberl et al. |
| 2013/0201439 A1 | 8/2013 | Kokonaski et al. |
| 2013/0215374 A1 | 8/2013 | Blum et al. |
| 2013/0235332 A1 | 9/2013 | Blum et al. |
| 2013/0242253 A1 | 9/2013 | Blum et al. |
| 2013/0250135 A1 | 9/2013 | Blum et al. |
| 2013/0250191 A1 | 9/2013 | Blum et al. |
| 2013/0250232 A1 | 9/2013 | Belbey et al. |
| 2013/0250233 A1 | 9/2013 | Blum et al. |
| 2013/0342807 A1 | 12/2013 | Blum et al. |
| 2014/0036266 A1 | 2/2014 | Kobayashi |
| 2014/0055746 A1 | 2/2014 | Nistico et al. |
| 2014/0055747 A1 | 2/2014 | Nistico et al. |
| 2014/0078283 A1 | 3/2014 | Nistico et al. |
| 2014/0085452 A1 | 3/2014 | Nistico et al. |
| 2014/0104566 A1 | 4/2014 | Kokonaski et al. |
| 2014/0132916 A1 | 5/2014 | Iyer et al. |
| 2014/0218647 A1 | 8/2014 | Blum et al. |
| 2014/0293215 A1 | 10/2014 | Blum et al. |
| 2014/0313473 A1 | 10/2014 | Willey |
| 2015/0062323 A1 | 3/2015 | Gustafsson et al. |
| 2015/0109192 A1 | 4/2015 | Huang |
| 2015/0226984 A1 | 8/2015 | Blum et al. |
| 2015/0244910 A1 | 8/2015 | Marston et al. |
| 2015/0248026 A1 | 9/2015 | Willey et al. |
| 2015/0250584 A1 | 9/2015 | Blum et al. |
| 2015/0335420 A1 | 11/2015 | Blum et al. |
| 2015/0378171 A1 | 12/2015 | Lee et al. |
| 2015/0378177 A1 | 12/2015 | Blum et al. |
| 2015/0378180 A1 | 12/2015 | Blum et al. |
| 2016/0026009 A1 | 1/2016 | Urbajs et al. |
| 2016/0033792 A1 | 2/2016 | Blum et al. |
| 2016/0070122 A1* | 3/2016 | Sales ................ A61B 5/443 351/158 |
| 2016/0078278 A1 | 3/2016 | Moore et al. |
| 2016/0139265 A1 | 5/2016 | Yahav et al. |
| 2016/0150163 A1 | 5/2016 | Wang et al. |
| 2016/0192836 A1 | 7/2016 | Blum et al. |
| 2016/0223840 A1 | 8/2016 | Chute et al. |
| 2016/0231593 A1 | 8/2016 | Blum et al. |
| 2016/0266412 A1 | 9/2016 | Yoshida |
| 2016/0363783 A1 | 12/2016 | Blum et al. |
| 2017/0010480 A1 | 1/2017 | Blum et al. |
| 2017/0027470 A1 | 2/2017 | Inoue et al. |
| 2017/0035293 A1 | 2/2017 | Nistico et al. |
| 2017/0052392 A1 | 2/2017 | Chute et al. |
| 2017/0123065 A1 | 5/2017 | Yahav et al. |
| 2017/0172729 A1 | 6/2017 | Blum et al. |
| 2017/0172730 A1 | 6/2017 | Blum et al. |
| 2017/0176777 A1 | 6/2017 | Blum et al. |
| 2017/0209256 A9 | 7/2017 | Blum et al. |
| 2017/0242276 A1 | 8/2017 | Willey |
| 2017/0265992 A1 | 9/2017 | Blum et al. |
| 2017/0307905 A1 | 10/2017 | Blum et al. |
| 2018/0221137 A1 | 8/2018 | Blum et al. |
| 2018/0289470 A1 | 10/2018 | Blum et al. |
| 2018/0329234 A1 | 11/2018 | Blum et al. |
| 2018/0333254 A1 | 11/2018 | Blum et al. |
| 2019/0086693 A1 | 3/2019 | Blum et al. |
| 2019/0110887 A1 | 4/2019 | Blum et al. |
| 2019/0235284 A1 | 8/2019 | Blum et al. |

FOREIGN PATENT DOCUMENTS

| | | |
|---|---|---|
| CN | 107111360 A | 8/2017 |
| CN | 107124898 A | 9/2017 |
| CN | 206805020 U | 12/2017 |
| CN | 206906788 U | 1/2018 |
| EP | 1118898 A1 | 7/2001 |
| JP | 2014509533 A | 4/2014 |
| JP | 2017068253 A | 4/2017 |
| TW | 200408850 A | 6/2004 |
| TW | M489290 U | 11/2014 |
| TW | I532377 B | 5/2016 |

OTHER PUBLICATIONS

Australian Office Action regarding Application No. 2018203706 dated May 17, 2019.
Partial European Search Report regarding Application No. 18211787.9 dated Mar. 1, 2019.
International Search Report regarding International Application No. PCT/CN2018/084374 dated Oct. 31, 2018. Translation provided by Unitalen Attorneys at Law.

* cited by examiner

DEVICE ADAPTED TO EYEGLASSES

CROSS-REFERENCE TO RELATED APPLICATIONS

The present application claims the benefit of priority to Chinese patent application No. 201810095919.1 titled "DEVICE ADAPTED TO EYEGLASSES", filed with the Chinese State Intellectual Property Office on Feb. 1, 2018, the entire disclosure of which is incorporated herein by reference.

FIELD

The present application generally relates to the technical field of eye-tracking, and more specifically, it relates to a device adapted to a pair of eyeglasses.

BACKGROUND

Eye-tracking technology is a technique for acquiring the subject's current "gazing direction" by using mechanical, electronic, optical and other various detection means. With the rapid development of computer vision, artificial intelligence technology and digitization technology, eye-tracking technology has become a current hot research field, and has a wide range of applications in the human-computer interaction field. For example, it can be applied to assisted driving of a vehicle, virtual reality, and diagnosis of cognitive disorder, etc.

However, a conventional eye-tracking device generally has deficiencies such as a complicated structure and a large occupied space, and therefore a poor wearing comfort. Especially in the case that the subject needs to wear a pair of eyeglasses, such as a pair of myopia eyeglasses, the conventional eye-tracking device tends to increase the subject's wearing difficulty and inconvenience. In addition, due to the complex structure, the conventional eye-tracking device has large limitations on portability, which does not facilitate the using between different subjects or regions, and does not facilitate the storage of the devices.

Therefore, there is a need for an eye-tracking device which can facilitate the subject's wearing and has an improved portability.

SUMMARY

In view of the issues in the conventional technology, a device is proposed according to the present application that can be adapted to a pair of general eyeglasses, greatly facilitates the wearing of different subjects, and has an improved portability.

According to an aspect of the present application, a device adapted to a pair of eyeglasses is provided, which includes a means for collecting eye data so as to detect an eye movement. The device includes an adaptation frame configured to retain the means for collecting eye data. The adaption frame includes an adaption unit configured to secure the adaption frame onto the pair of eyeglasses and/or remove the adaption frame from the pair of eyeglasses.

In the device according to the present application, the means for collecting eye data is retained by using the adaption frame, and the adaption frame is provided with the adaption unit for securing the adaption frame onto the pair of eyeglasses and/or removing the adaption frame from the pair of eyeglasses, and thus, the device can be adapted to the pair of eyeglasses in a removable manner. For a subject who needs to wear a pair of eyeglasses per self, the device according to the present application frees the subject from further wearing a device having a complicated structure, which greatly reduces the difficulty and inconvenience in wearing of the subject. Moreover, the device according to the present application has a simple structural design, can be adapted to the pair of eyeglasses in a removable manner, can improve the portability in use, and also facilitates storage.

BRIEF DESCRIPTION OF THE DRAWINGS

The drawings of this specification are intended to provide a further understanding of the present application and constitute a part of the present application, and should not be construed as unduly limiting the present application. In the drawings.

DETAILED DESCRIPTION

In order to make the person skilled in the art better understand the present application, the embodiments of the present application will be described clearly and completely hereinafter in conjunction with the drawings. It may be understood that the described embodiments are only some rather than all of the embodiments of the present application. Based on the described embodiments, all other embodiments obtained by the person skilled in the art without creative efforts should fall within the scope of protection of the present application.

Figure 1:
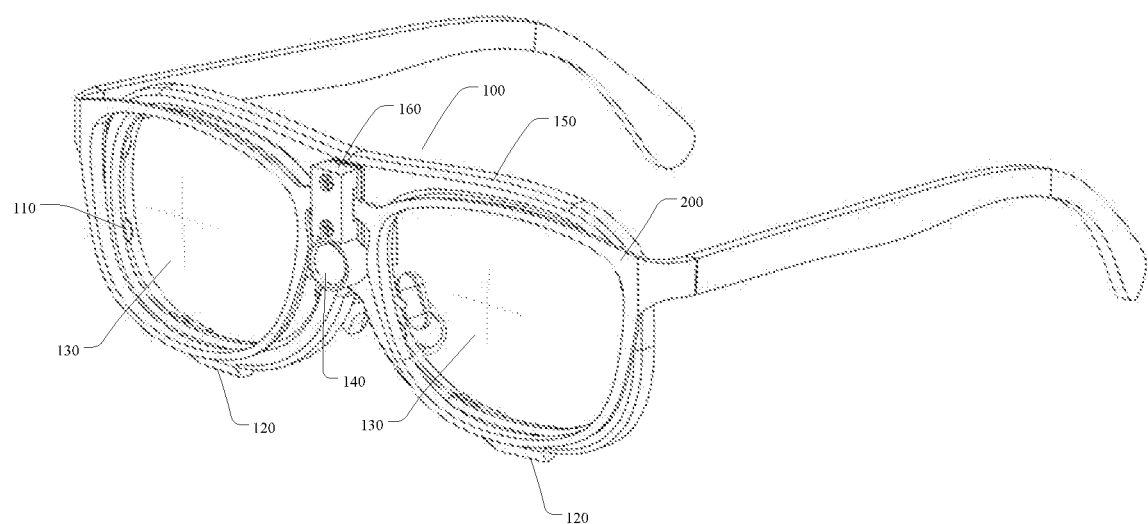
FIG. 1 is a perspective view of a device adapted to a pair of eyeglasses according to an embodiment of the present application, which schematically shows a state in which the device is secured onto the pair of eyeglasses.

FIG. 1 is a perspective view of a device adapted to a pair of eyeglasses according to an embodiment of the present application, which schematically shows a state in which the device is secured onto the pair of eyeglasses.

A device 100 adapted to a pair of eyeglasses 200 according to the embodiment of the present application may include a means for collecting eye data. The means for collecting eye data may include at least one of an optical system, a MEMS microelectromechanical system, a capacitive sensor, and a myoelectric current detector.

FIG. 1 shows an example that the means for collecting eye data according to an embodiment of the present application includes an optical system. As shown in FIG. 1, the optical system may include an illumination light source 110 and an image sensor 120. The illumination light source 110 may be, for example, an infrared light source that does not affect vision, and the image sensor 120 may be, for example, an infrared camera. An eye is illuminated with an infrared light source, thus, a glint is formed on a cornea of the eye, and the camera captures the position of the glint as well as a position of a pupil, thereby collecting eye data. The illumination light source 110 may be multiple illumination light sources, and FIG. 1 shows only a part of the illumination light sources.

The means for collecting eye data may further include an optical lens 130 for providing particular optical characteristics. As shown in FIG. 1, the optical lens 130 may be arranged to be vertically secured to the device 100. The optical lens 130 may be, for example, an infrared filter for filtering out interfering infrared light to facilitate collection of eye data. The person skilled in the art can understand that the type of the optical lens 130 may be properly selected according to different design requirements.

In addition, the means for collecting eye data may further include a scene camera 140 for capturing information about the environment where a subject is located. For example, when a particular reference point is set in a scene observed by a subject, it is possible to facilitate collection of eye data by capturing such a scene image. As shown in FIG. 1, the scene camera 140 may be arranged at an outer side of the device 100. The scene camera may include an RGB color scene camera, an IR infrared scene camera, an RGBIR scene camera, and a depth sensor. It can be understood by the person skilled in the art that the scene camera 140 may be properly selected according to different design requirements.

Although FIG. 1 schematically shows an example that the means for collecting eye data includes an optical system, the present application is not limited to this.

According to an example, the means for collecting eye data may be a MEMS microelectromechanical system, including, for example, a MEMS infrared scan mirror, an infrared light source, an infrared receiver.

According to another example, the means for collecting eye data may be a capacitive sensor for detecting eye movements by a capacitance between the eye and a capacitor plate.

According to another example, the means for collecting eye data may be a myoelectric current detector, for example, by placing an electrode on a nose bridge, a forehead, an ear or an ear lobe, and eye movements are detected by the signal patterns of the detected myoelectric current.

The device according to an embodiment of the present application may include an adaption frame 150 configured to retain the means for collecting eye data. FIG. 1 shows an embodiment in which an adaption frame retains an optical system according to the present application. As shown in FIG. 1, the adaption frame 150 may be configured to retain the illumination light source 110 and the image sensor 120, the optical lens 130, and the scene camera 140.

The adaption frame according to an embodiment of the present application may include an adaption unit 160 configured to secure the adaption frame 150 onto the pair of eyeglasses 200 and/or remove the adaption frame 150 from the pair of eyeglasses 200.

According to the present application, the means for collecting eye data is retained by the adaption frame, and the adaption frame is provided with the adaption unit for securing the adaption frame to the pair of eyeglasses and/or removing the adaption frame from the pair of eyeglasses, thereby, the device according to the present application can be adapted to the pair of eyeglasses in a removable manner. In addition, the device according to the present application imposes no special requirements on the pair of eyeglasses, and any eyeglasses worn by ordinary subjects, such as a pair of myopia eyeglasses, can meet the requirements.

Accordingly, for a subject who needs to wear a pair of eyeglasses per self, the device according to the present application avoids the subject from further wearing an apparatus having a complicated structure, which greatly reduces difficulty and inconvenience in wearing for the subject. Moreover, the device according to the present application is easily to be structured to be adapted to the pair of eyeglasses in a removable manner so as to improve the portability in use and to facilitate storage.

It should be noted that the device according to the present application may include an interface for connecting to a computing device such as a processor for processing data. Although the interface is not shown in the drawings, the person skilled in the art may understand that the position and type of the interface can be changed according to different design requirements, the detail of which is omitted herein.

According to an embodiment of the present application, the adaption frame 150 may be secured to an inner side of the pair of eyeglasses 200, that is, the side facing the eye of the pair of eyeglasses 200. FIG. 1 exemplarily shows an embodiment in which the adaption frame 150 is secured to the inner side of the pair of eyeglasses 200.

According to another embodiment of the present application, the adaption frame 150 may also be secured to an outer side of the pair of eyeglasses 200, i.e., the side, facing the scene viewed by the subject, of the pair of eyeglasses 200. Although the embodiment is not shown in the drawings, it can be understood by the person skilled in the art that, when the adaption frame 150 is secured to the outer side of the pair of eyeglasses 200, the principle is similar to that of the embodiment in which the adaption frame 150 is secured to the inner side of the pair of eyeglasses 200. The difference lies in that, in the case where the adaption frame 150 retains the optical system, it is necessary to perform adaptive design to, for example, the illumination light source 110 and the image sensor 120, which will be specifically described below.

The advantage of securing the adaption frame 150 to the inner side of the pair of eyeglasses 200 is that there is no need to specially design the device for collecting eye data, for example, the illumination light source 110 and the image sensor 120 in the optical system scenario, since a light path of a light beam emitted by the illumination light source 110 for illuminating the eye and a light path of a light beam received by the image sensor 120 are not adversely affected by the pair of eyeglasses 200, particularly a lens of the pair of eyeglasses. The advantage of securing the adaption frame 150 to the outer side of the pair of eyeglasses 200 is that the means secured to the pair of eyeglasses 200 for use is farther away from eyes, which reduces the feeling of intrusion brought by the device to the subject so as to improve the comfort of use.

According to an embodiment, as shown in FIG. 1, the adaption unit 160 may include a central positioning means for securing the adaption frame 150 to a central cross member of the pair of eyeglasses 200 and/or removing the adaption frame 150 from the central cross member. The central positioning means according to this embodiment utilizes the relatively great load-bearing capacity at the central cross member of the pair of eyeglasses to centralize the weight of the device on a central position of the pair of eyeglasses, which can provide greater stability for the installation of the device and does not cause an imbalance feeling of the subject when wearing the device.

According to other embodiments, although not shown in the drawings of the present application, the person skilled in the art may understand that, the adaption unit can be arranged at other positions as well depending on different design requirements. According to some embodiments, the adaption unit may include a lens damper configured to secure the adaption frame on the lens of the pair of eyeglasses and/or remove the adaption frame from the lens, a frame damper configured to secure the adaption frame to a frame of the pair of eyeglasses, and/or remove the adaption frame from the frame of the pair of eyeglasses.

Figure 2A:
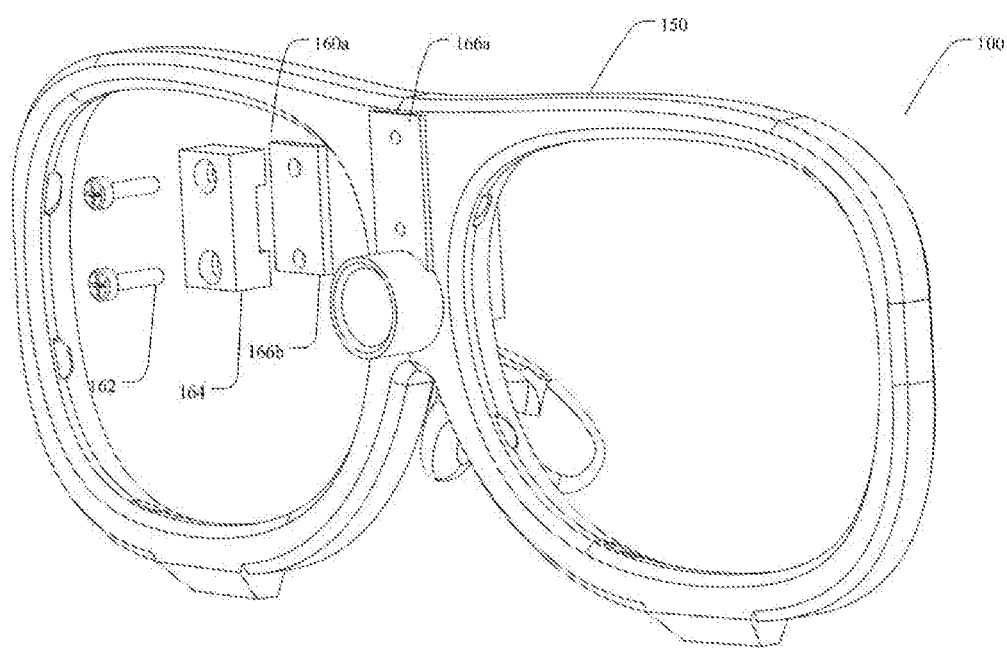
FIG. 2(a) is an exploded view of a central positioning means according to an embodiment of the present application.
Figure 2B:
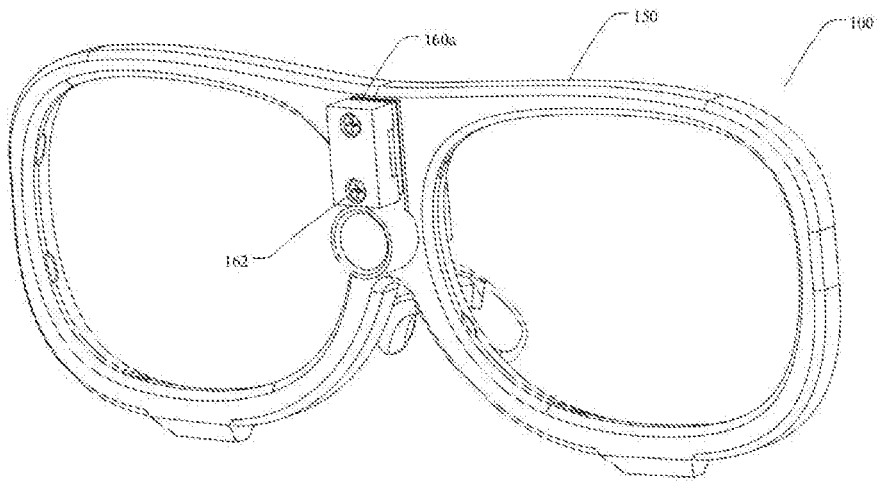
FIG. 2(b) is an assembled view of the central positioning means according to an embodiment of the present application.

FIG. 2(a) is an exploded view of a central positioning means according to an embodiment of the present application, and FIG. 2(b) is an assembled view of the central positioning means according to an embodiment of the present application.

According to an embodiment of the present application, the central positioning means 160a may include an accommodating portion configured to accommodate the central cross member of the eyeglasses.

According to an example, the accommodating portion may be formed by at least a pair of fasteners 162 fastened to the adaption frame 150 to accommodate the central cross member of the pair of eyeglasses. Preferably, each pair of fasteners 162 is arranged vertically, that is, in a direction perpendicular to the central cross member. However, the person skilled in the art may understand that each pair of fasteners 162 may also be arranged in a direction at other angles with respect to the central cross member rather than perpendicular to the central cross member, as long as the central cross member can be secured in the formed accommodating portion to achieve the gist of the present application. Such an embodiment also falls within the scope of protection of the present application.

For example, the fasteners 162 may include screws. The accommodating portion formed in this way may ensure that the adaption frame is firmly secured to the central cross member of the pair of eyeglasses. The state in which the pair of fasteners 162 are fastened to the adaption frame 150 may be as shown in FIG. 2(b).

As shown in FIG. 2(a), a pair of screws fastened to the adaption frame 150 may be vertically arranged. For accommodating the central cross member of the pair of eyeglasses, the pair of screws may be fastened to a central portion of the adaption frame 150, for example. The distance between the pair of screws can be set differently depending on different requirements. The person skilled in the art may understand that the distance can be determined in consideration factors such as the material and the shape of the pair of eyeglasses. For example, when the pair of eyeglasses is made of a metallic material, the central cross member is generally thin, in this case the distance between the pair of screws can be designed to be short so as to be adapted to such eyeglasses.

When the device according to the present application is to be secured onto the pair of eyeglasses, the central cross member of the pair of eyeglasses can be placed in a space formed between the pair of screws, thereby forming the accommodating portion for accommodating the central cross member. Reference may be made to FIG. 1 for the state that the device according to the present application is secured onto the pair of eyeglasses, the detail of which is omitted here. Similarly, when the device according to the present application is to be removed from the pair of eyeglasses, the pair of screws can be unscrewed to remove the device from the pair of eyeglasses.

It should be noted that although FIG. 2(a) shows that a pair of screws is provided as the fasteners, the person skilled in the art may understand that more fasteners can be provided according to different requirements, thereby providing greater stability for the securing of the device.

Further, the accommodating portion may further include a blocking member 164 for blocking the movement of the central cross member. The blocking member 164 may be secured to the fasteners 162 in a manner of being penetrated by the fasteners 162. The provision of the blocking member provides greater stability for the securing of the device.

Reference may be made to FIG. 2(b) for the state in which the blocking member is secured to the fasteners, the detail of which is omitted here.

Further, the accommodating portion may include flexible cushioning members 166a, 166b which may be arranged between the blocking member 164 and the adaption frame 150. As shown in FIG. 2(a), the flexible cushioning member 166a may be secured to the adaption frame 150. Since the central cross member of the pair of eyeglasses is generally a curved surface with a certain curvature, providing the flexible cushioning member 166a on the adaption frame 150 can eliminate the adverse effect of the above curved surface on the fitting of the parts and improve the stability of the device. In addition, as shown in FIG. 2(a), a flexible cushioning member 166b may be arranged between the flexible cushioning member 166a and the blocking member 164 for further improving the adaptability between the parts.

For example, the flexible cushioning member may be a flexible plastic. The cushion effect produced by the flexibility of the flexible cushioning member enables the adaption frame and the pair of eyeglasses to be more closely attached, and the securing of the device to be more stable.

Although the accommodating portion described in connection with the example in FIGS. 2(a), 2(b) is formed by the fastener, the present application is not limited thereto.

According to another example, the accommodating portion may include a supporting protrusion provided on the adaption frame, and the supporting protrusion is provided with a slot extending in a lateral direction, namely, the direction of the central cross member of the pair of eyeglasses. When the device according to the present application is to be secured onto the pair of eyeglasses, the central cross member of the pair of eyeglasses can be placed in the slot.

Preferably, the slot may include flexible cushioning members arranged on two sides, extending in the lateral direction, of the slot. For example, each of the flexible cushioning members may be a flexible plastic. The size of the slot can be finely adjusted by means of the flexible cushioning member, whereby the adaptability of the slot with the central cross member of the pair of eyeglasses is higher, so that the securing of the device is more stable.

Figure 3:
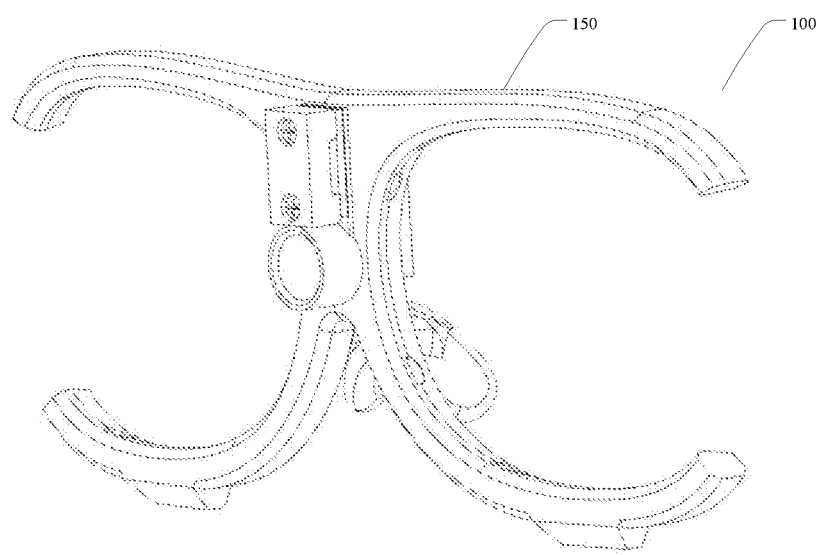
FIG. 3 is a view of an adaption frame having a shape which is opened at two sides according to an embodiment of the present application.

According to an embodiment of the present application, the adaption frame may include a shape, which is fully-closed, corresponding to the profile of the lens of the pair of eyeglasses. Alternatively, the adaption frame may include a shape, which is opened at two sides. FIG. 1 exemplarily shows that the adaptation frame is a fully-closed shape. Such a fully-closed shape facilitates even distribution of the illumination light source on the adaption frame. FIG. 3 is a schematic view of the adaption frame having a shape, which is opened at two sides, according to an embodiment of the present application. The advantages of the shape being opened at two sides lie in that the device has a smaller volume and a lighter weight, and is easier to be adapted to eyeglasses with different shapes.

Figure 4:
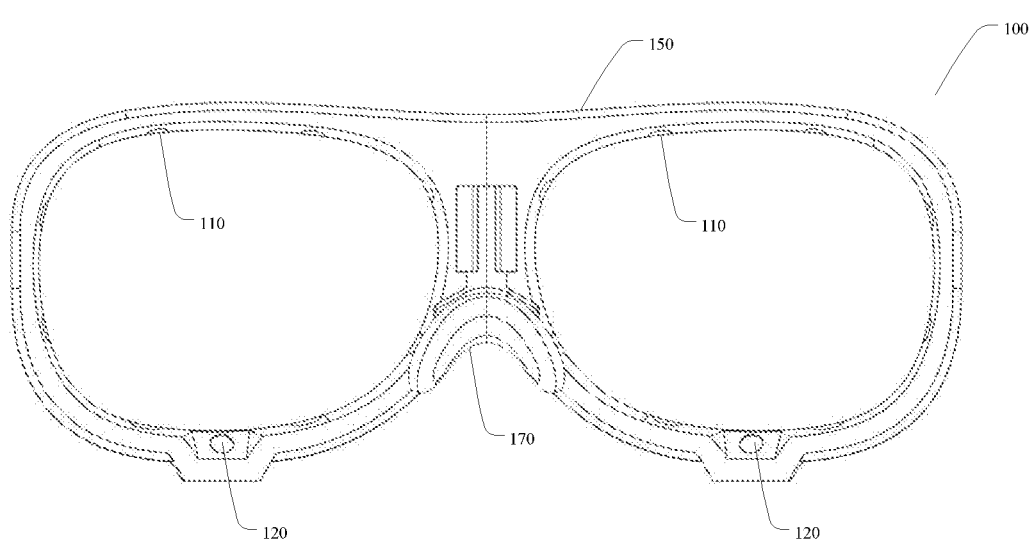
FIG. 4 is a view of an inner side of an adaption frame according to an embodiment of the present application.

FIG. 4 is a view of an inner side of an adaption frame according to an embodiment of the present application.

Further, the adaption frame 150 may further include a retaining portion 170 for retaining the device on the nose bridge. FIG. 4 schematically shows a retaining portion according to an embodiment.

In addition, as described above, according to an embodiment of the present application, the adaption frame may be secured to an inner side or an outer side of the pair of eyeglasses.

In the case that the adaption frame 150 is secured to the inner side of the eyeglasses, the illumination light source 110 may include multiple illumination light sources, and the multiple illumination light sources are evenly distributed on the adaption frame 150. FIG. 4 shows that the left and right sides of the adaption frame are each uniformly distributed with 8 illumination light sources. The image sensor 120 may be arranged at the bottom of the adaption frame 150, for example.

In the case that the adaption frame is secured to the outer side of the pair of eyeglasses, the illumination light source may include multiple illumination light sources, and the multiple illumination light sources cooperate with the image sensor so that light beams emitted by the multiple illumination light sources for illuminating the eye and light beams received by the image sensor are not blocked by the pair of eyeglasses. In other words, the pair of eyeglasses is located outside of the light path formed by the multiple illumination light sources, the image sensor and the eye. Although this embodiment is not shown in the drawings, it should be understood that the embodiment also falls into the scope of the present application.

In the above embodiments of the present application, the description of each embodiment has its own emphasis. For the part not described in detail in a certain embodiment, reference may be made to the relevant description of other embodiments.

Only the preferred embodiments of the present application are described above, it should be pointed out that for the person skilled in the art, various improvements and modifications can be made without departing from the principle of the present application, and these improvements and modifications should also be deemed as falling within the scope of protection of the present application.

What is claimed is:

1. A device adapted to a pair of eyeglasses, comprising:
a means for collecting eye data, and
an adaptation frame configured to retain the means for collecting eye data,
wherein the adaption frame comprises an adaption unit configured to secure the adaption frame onto the pair of eyeglasses and/or remove the adaption frame from the pair of eyeglasses,
wherein the adaption unit comprises a central positioning means configured to secure the adaption frame to a central cross member of the pair of eyeglasses and/or remove the adaption frame from the central cross member,
wherein the central positioning means comprises an accommodating portion configured to accommodate the central cross member of the pair of eyeglasses,
wherein the accommodating portion is formed by at least one pair of fasteners fastened to the adaption frame, and
wherein the accommodating portion further comprises a blocking member for blocking the movement of the central cross member, wherein the blocking member is secured onto the fasteners in a manner of being penetrated by the fasteners.

2. The device according to claim 1, wherein the fasteners comprise a screw.

3. The device according to claim 1, wherein the accommodating portion further comprises a flexible cushioning member arranged between the blocking member and the adaption frame.

4. The device according to claim 1, wherein the accommodating portion is formed by a supporting protrusion provided on the adaption frame, wherein the supporting protrusion is provided with a slot extending in a lateral direction.

5. The device according to claim 4, wherein the slot comprises flexible cushioning members arranged on two sides, extending in the lateral direction, of the slot.

6. The device according to claim 1, wherein the adaption frame comprises a retaining portion for retaining the device on a nose bridge.

7. The device according to claim 1, wherein the adaption frame has a shape, which is fully-closed, corresponding to a profile of a lens of the pair of eyeglasses, or a shape opened at two sides.

8. The device according to claim 1, wherein the adaption unit comprises a lens clamper configured to secure the adaption frame onto a lens of the pair of eyeglasses and/or remove the adaption frame from the lens, or a frame clamper configured to secure the adaption frame to a frame of the eyeglasses and/or remove the adaption frame from the frame of the pair of eyeglasses.

9. A device adapted to a pair of eyeglasses, comprising:
a means for collecting eye data, and
an adaptation frame configured to retain the means for collecting eye data,
wherein the adaption frame comprises an adaption unit configured to secure the adaption frame onto the pair of eyeglasses and/or remove the adaption frame from the pair of eyeglasses,
wherein the means for collecting eye data comprises at least one of an optical system, a MEMS microelectromechanical system, a capacitive sensor, and a myoelectric current detector,
wherein the optical system comprises an illumination light source and an image sensor.

10. The device according to claim 9, wherein in the case that the adaption frame is secured to an inner side of the pair of eyeglasses, the illumination light source comprises a plurality of illumination light sources, and the plurality of illumination light sources are evenly distributed on the adaption frame.

11. The device according to claim 9, wherein in the case that the adaption frame is secured to an outer side of the pair of eyeglasses, the illumination light source comprises a plurality of illumination light sources, and the plurality of illumination light sources cooperate with the image sensor to allow light beams of the plurality of illumination light sources illuminating the eye and light beams received by the image sensor not to be blocked by the pair of eyeglasses.

12. The device according to claim 9, wherein the means for collecting eye data further comprises an optical lens and/or a scene camera.

13. The device according to claim 12, wherein the optical lens is an infrared filter.

14. The device according to claim 13, wherein the scene camera is at least one of an RGB color scene camera, an IR infrared scene camera, an RGBIR scene camera, and a depth sensor.

* * * * *